United States Patent
Benndorf et al.

(10) Patent No.: US 12,487,667 B2
(45) Date of Patent: Dec. 2, 2025

(54) CORRECTED GAZE DIRECTION AND ORIGIN

(71) Applicant: Apple Inc., Cupertino, CA (US)

(72) Inventors: Julia Benndorf, Mountain View, CA (US); Qichao Fan, San Francisco, CA (US); Julian K Shutzberg, San Francisco, CA (US); Paul A Lacey, Davie, FL (US); Hua Gao, San Jose, CA (US)

(73) Assignee: Apple, Inc., Cupertino, CA (US)

( * ) Notice: Subject to any disclaimer, the term of this patent is extended or adjusted under 35 U.S.C. 154(b) by 0 days.

(21) Appl. No.: 18/470,359

(22) Filed: Sep. 19, 2023

(65) Prior Publication Data

US 2024/0103618 A1 Mar. 28, 2024

Related U.S. Application Data

(60) Provisional application No. 63/376,946, filed on Sep. 23, 2022.

(51) Int. Cl.
*G09G 5/00* (2006.01)
*G06F 3/01* (2006.01)
*H04N 13/344* (2018.01)

(52) U.S. Cl.
CPC ........... *G06F 3/013* (2013.01); *H04N 13/344* (2018.05)

(58) Field of Classification Search
CPC ........ G06F 3/0487; G06F 3/015; G06F 3/167; G06F 3/013; G06F 3/017; G06F 3/0304; G06T 7/593; G06T 19/006; G06T 7/97; G06T 7/70; G06T 15/20; G06T 2210/62; H04N 13/344; H04N 13/128; H04N 13/383; A61B 3/113; G02B 27/0172;

(Continued)

(56) References Cited

U.S. PATENT DOCUMENTS 10,554,950 B1  2/2020  Curlander
2013/0021373 A1*  1/2013  Vaught .................. G06F 3/013
                                                              345/633

(Continued)

FOREIGN PATENT DOCUMENTS

WO  2016073131  5/2016
WO  2022261205  12/2022

OTHER PUBLICATIONS

Extended European Search Report from European Patent Application 23199094.6, dated Feb. 16, 2024, pp. 1-10.

*Primary Examiner* — Jennifer T Nguyen
(74) *Attorney, Agent, or Firm* — Robert C. Kowert; Kowert, Hood, Munyon, Rankin & Goetzel, P.C.

(57) ABSTRACT

Methods and apparatus for correcting the gaze direction and the origin (entrance pupil) in gaze tracking systems. During enrollment after an eye model is obtained, the pose of the eye when looking at a target prompt is determined. This information is used to estimate the true visual axis of the eye. The visual axis may then be used to correct the point of view (PoV) with respect to the display during use. If a clip-on lens is present, a corrected gaze axis may be calculated based on the known optical characteristics and pose of the clip-on lens. A clip-on corrected entrance pupil may then be estimated by firing two or more virtual rays through the clip-on lens to determine the intersection between the rays and the corrected gaze axis.

20 Claims, 11 Drawing Sheets

(58) Field of Classification Search
CPC ........ G02B 27/0093; G02B 2027/0134; G02B 2027/0138; G02B 2027/0178
USPC .......................................................... 345/8
See application file for complete search history.

(56) References Cited

U.S. PATENT DOCUMENTS

| | | |
|---|---|---|
| 2013/0050642 A1 | 2/2013 | Lews et al. |
| 2013/0156265 A1 | 6/2013 | Hennessy |
| 2014/0055591 A1 | 2/2014 | Katz |
| 2015/0288944 A1* | 10/2015 | Nistico ................ G06F 3/0487 345/156 |
| 2016/0018646 A1* | 1/2016 | Osterhout ............. G06V 20/39 345/8 |
| 2016/0134863 A1 | 5/2016 | Horesh |
| 2017/0263007 A1 | 9/2017 | Cavin |
| 2018/0032812 A1 | 2/2018 | Sengelaub et al. |
| 2018/0246336 A1 | 8/2018 | Greenberg |
| 2019/0042842 A1* | 2/2019 | Cavin .................. G06V 40/197 |
| 2019/0392145 A1 | 12/2019 | Komogortsev |
| 2020/0033560 A1 | 1/2020 | Weber et al. |
| 2020/0257359 A1 | 8/2020 | Klingstrom |
| 2021/0011549 A1 | 1/2021 | Ryan et al. |
| 2021/0173206 A1* | 6/2021 | Das ........................ G06V 40/18 |
| 2022/0270645 A1* | 8/2022 | Song ..................... G02B 27/0093 |
| 2023/0038781 A1* | 2/2023 | Ryu ........................ G02C 11/10 |
| 2024/0211038 A1 | 6/2024 | Qin et al. |
| 2024/0211039 A1 | 6/2024 | Qin et al. |

\* cited by examiner

CORRECTED GAZE DIRECTION AND ORIGIN

This application claims benefit of priority to U.S. Provisional Application Ser. No. 63/376,946, entitled "Corrected Gaze Direction and Origin," filed Sep. 23, 2022, and which is hereby incorporated herein by reference in its entirety.

BACKGROUND

Extended reality (XR) systems such as mixed reality (MR) or augmented reality (AR) systems combine computer generated information (referred to as virtual content) with real world images or a real-world view to augment, or add content to, a user's view of the world. XR systems may thus be utilized to provide an interactive user experience for multiple applications, such as applications that add virtual content to a real-time view of the viewer's environment, interacting with virtual training environments, gaming, remotely controlling drones or other mechanical systems, viewing digital media content, interacting with the Internet, or the like.

SUMMARY

Various embodiments of methods and apparatus for correcting the gaze direction and origin in eye tracking systems, for example gaze tracking systems used in head-mounted devices (HMDs) including but not limited to HMDs used in extended reality (XR) applications are described. HMDs may include wearable devices such as headsets, helmets, goggles, or glasses. An XR system may include an HMD which may include one or more cameras that may be used to capture still images or video frames of the user's environment. The HMD may include lenses positioned in front of the eyes through which the wearer can view the environment. In XR systems, virtual content may be displayed on or projected onto these lenses to make the virtual content visible to the wearer while still being able to view the real environment through the lenses.

In at least some systems, the HMD may include gaze tracking technology. In an example gaze tracking system, one or more infrared (IR) light sources emit IR light towards a user's eye. A portion of the IR light is reflected off the eye and captured by an eye tracking camera. Images captured by the eye tracking camera may be input to a glint and pupil detection process, for example implemented by one or more processors of a controller of the HMD. Results of the process are passed to a gaze estimation process, for example implemented by one or more processors of the controller, to estimate the user's current point of gaze. This method of gaze tracking may be referred to as PCCR (Pupil Center Corneal Reflection) tracking.

In such gaze tracking systems, during an initial calibration or enrollment process, a model of the user's eye may be generated from one or more images of the eye captured as described above. This model is then used in various algorithms, for example in the gaze estimation process, during use of the device. The eye model may include information such as the cornea, iris and pupil shape, eye center, entrance pupil, and the eye's optical axis (a vector which passes through the eye center and the entrance pupil).

Conventionally, the optical axis is used in rendering virtual content for display and in the gaze estimation process to determine the point on the display at which the user is looking. However, the actual visual axis of the human eye is offset from the optical axis determined by the eye modeling method. In addition, the actual entrance pupil may be different than the entrance pupil determined by the eye modeling method. These differences between the actual and the modeled eye features may result in errors when displaying virtual content or in determining what the user is looking at on the display.

Embodiments of methods and apparatus for correcting the gaze direction and the origin (entrance pupil) in gaze tracking systems are described. In embodiments, a step is performed during enrollment after the eye model is obtained that determines the pose of the eye when looking at a target prompt. This information is used to estimate the true visual axis for the eye. The estimated visual axis may then be used to correct the point of view (PoV) with respect to the display during use. If a clip-on lens is present, a corrected gaze axis may be calculated based on the known optical characteristics and pose of the clip-on lens. A clip-on corrected entrance pupil may then be estimated by firing two or more virtual rays through the clip-on lens to determine the intersection between the rays and the corrected gaze axis.

In some embodiments, during use of a device such as an HMD, to determine what the eye is looking at on the display, the PoV correction may be applied. In some embodiments, the virtual content to be displayed may be adjusted based on the PoV correction. In some embodiments, if a clip-on lens is present, the clip-on correction may be applied before the PoV correction.

Figure 1:
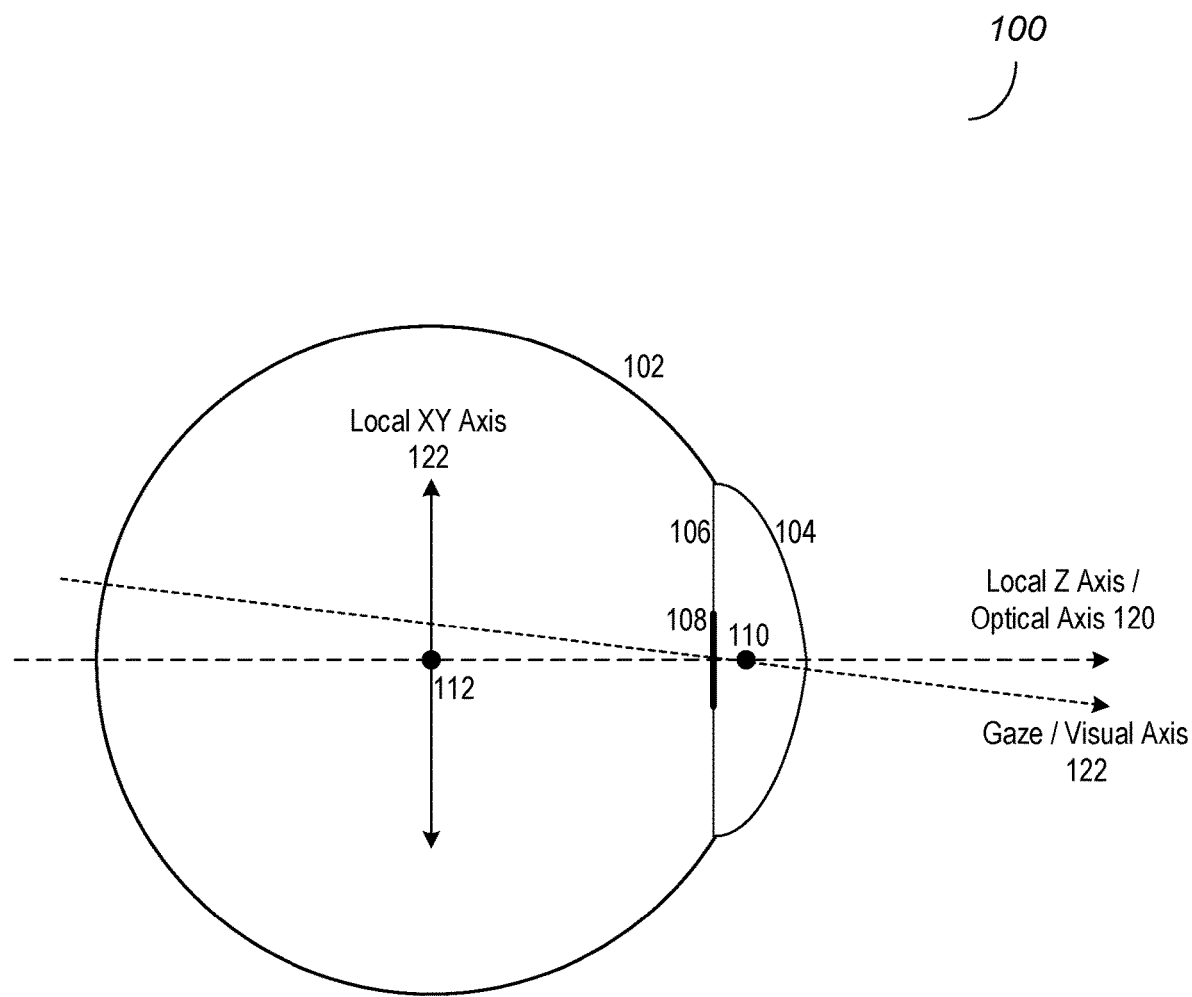
FIG. 1 illustrates the optical axis and the visual axis of an eye.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for correcting the gaze direction and origin in eye tracking systems, for example gaze tracking systems used in head-mounted devices (HMDs) including but not limited to HMDs used in extended reality (XR) applications are described. HMDs may include wearable devices such as headsets, helmets, goggles, or glasses. An XR system may include an HMD which may include one or more cameras that may be used to capture still images or video frames of the user's environment. The HMD may include lenses positioned in front of the eyes through which the wearer can view the environment. In XR systems, virtual content may be displayed on or projected onto these lenses to make the virtual content visible to the wearer while still being able to view the real environment through the lenses.

In at least some systems, the HMD may include gaze tracking technology. In an example gaze tracking system, one or more infrared (IR) light sources emit IR light towards a user's eye. A portion of the IR light is reflected off the eye and captured by an eye tracking camera. Images captured by the eye tracking camera may be input to a glint and pupil detection process, for example implemented by one or more processors of a controller of the HMD. Results of the process are passed to a gaze estimation process, for example implemented by one or more processors of the controller, to estimate the user's current point of gaze. This method of gaze tracking may be referred to as PCCR (Pupil Center Corneal Reflection) tracking.

FIG. 1 illustrates the optical axis 120 and the visual axis 122 of an eye. Physical components of an eye may include a sclera 102, cornea 104, iris 106, and pupil 108. In some embodiments of a gaze tracking system, during an initial calibration or enrollment process, an N-dimensional model of the user's eye 100 may be generated from one or more images of the eye 100. In an example method, one or more infrared (IR) light sources emit IR light towards a user's eye. A portion of the IR light is reflected off the eye and captured by an eye tracking camera. Two or more images captured by the eye tracking camera may be input to an eye model generating process, for example implemented by one or more processors of a controller of the HMD. The process may determine the geometric shapes and relationships of the eye's components based at least in part on positions of the glints (reflections of the point light sources) in the two or more captured images.

The eye model may then then used in various algorithms, for example in the gaze estimation process, during use of the device. The eye model may include, but is not limited to, information describing the cornea 104, iris 106, and pupil 108 shape, eye center 112, entrance pupil 110, and the eye's optical axis 120 (a vector which passes through the eye center and the entrance pupil). In some embodiments, the eye center 112 and entrance pupil 110 may be estimated based at least in part on the cornea 104, iris 106, and pupil 108 shape, and the optical axis 120 may be determined based on the estimated eye center 112 and entrance pupil 110.

Conventionally, the optical axis 120 is used in rendering virtual content for display and in the gaze estimation process to determine the point on the display at which the user is looking. However, the actual visual axis 122 of the human eye is offset from the optical axis 120 determined by the eye modeling method. In addition, the actual entrance pupil may be different than the entrance pupil 110 determined by the eye modeling method. These differences between the actual and the modeled eye features may result in errors when displaying virtual content or in determining what the user is looking at on the display.

Figure 2:
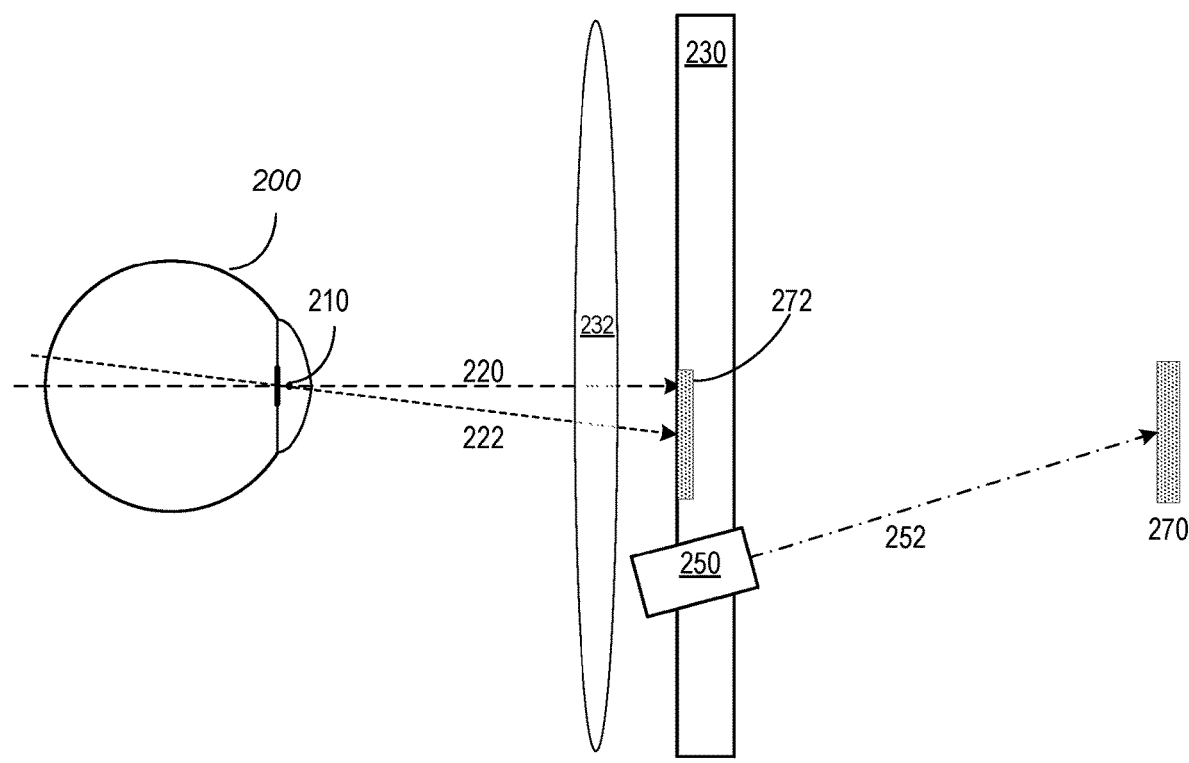
FIG. 2 illustrates correcting the point of view in an optical system, according to some embodiments.

Embodiments of methods and apparatus for correcting the gaze direction and the origin (entrance pupil) in gaze tracking systems are described. FIG. 2 illustrates correcting the point of view in an optical system, according to some embodiments. A device may include a display 230, a world-facing camera 250 (also referred to as a point of view (PoV) camera), and an optical lens system 232 through which the eye 200 views content on the display 230. The optical system may also include gaze tracking technology that includes eye tracking cameras. The gaze tracking technology may be leveraged to generate an N-dimensional model of the user's eye during a calibration or enrollment process as previously described.

In some embodiments, a process is performed after the eye model is obtained that determines the pose of the eye 200 when looking at a target prompt on the display 230. This information is used to estimate the true visual axis 222 for the eye 200. Visual axis 222 may then be used to correct the point of view (PoV) with respect to the display 230 during use.

As shown in FIG. 2, the PoV camera 250 has an optical axis, referred to as the PoV camera (PoVC) axis 252. The PoV camera 250 may be considered the render origin. Geometry between the PoV camera 250 and the display 230 is known from device calibration. During use of the device, the PoV camera 250 captures video of the environment, which in this example includes a physical object 270. The captured video may be processed by the device to determine virtual content 272 corresponding to object 270 to be rendered and displayed on display 230 as "overlaid" virtual content. Location for the virtual content 272 on the display 230 may be determined based at least in part on PoVC axis 252. However, when determining where the eye 200 is looking at the display using gaze tracking, the modeled visual axis 222 will be off from the PoVC axis 252. Thus, the visual axis 222 needs to be translated to originate from the render origin 250 according to the device calibration.

Figure 3:
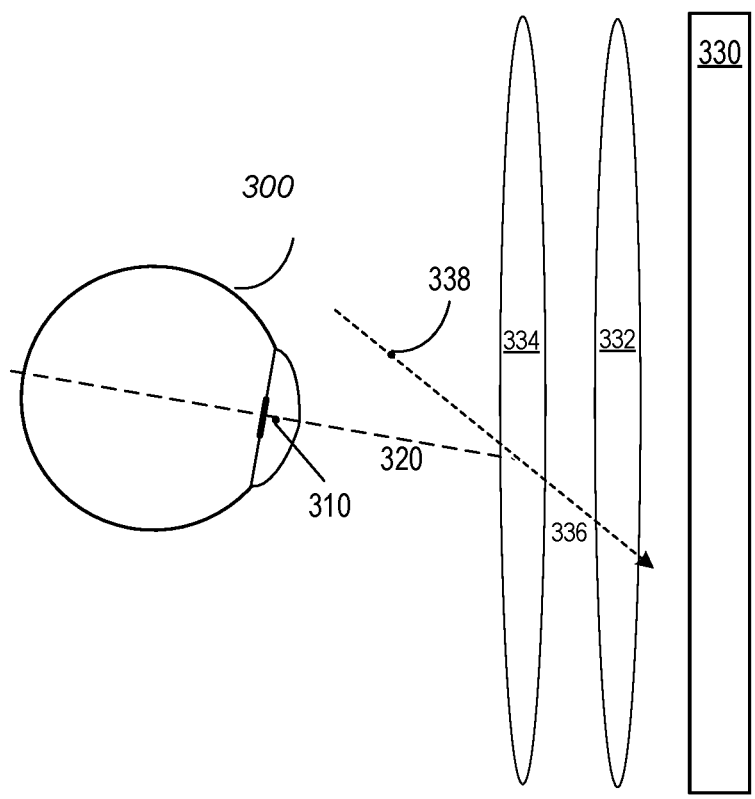
FIG. 3 illustrates correcting for a clip-on lens, according to some embodiments.

FIG. 3 illustrates correcting for a clip-on lens, according to some embodiments. Some HMDs may allow the insertion of corrective "clip-on" lenses 334 between the display 330 and the eye 300. If a clip-on lens 334 is present, a corrected gaze axis 336 may be calculated based on the known optical characteristics and pose of the clip-on lens 334. A clip-on corrected entrance pupil 338 may then be estimated by firing two or more virtual rays through the clip-on lens 334 to determine the intersection between the rays and the corrected gaze axis.

In some embodiments, during enrollment, the corrected visual axis is determined as illustrated in FIG. 2. If a clip-on lens is present, the clip-on corrected visual axis is then determined as illustrated in FIG. 3. In some embodiments, during use of a device such as an HMD, to determine what the eye is looking at on the display, the PoV correction may be applied as illustrated in FIG. 2. In some embodiments, the position of virtual content to be displayed may be adjusted based on the PoV correction. In some embodiments, if a clip-on lens is present, the clip-on correction to the visual axis may be applied before the PoV correction is applied.

The clip-on corrected entrance pupil may, for example, be used in correcting the content to be displayed. Due to the presence of lenses between the user's eyes and the display, without correction the content may appear warped or distorted. To account for this, the system may apply an algorithm to warp the content prior to display to counter the distortion caused by the lens(es). In performing the warp, the pupil position/entrance pupil is used. If the entrance pupil from the eye model is used, the warp would be off due to the distortion introduced by the clip-on lens. The estimated clip-on corrected entrance pupil may thus be used in performing the warp to correct for the presence of the clip-on lens.

While embodiments are generally described and illustrated with reference to one eye, there may be eye tracking cameras for both eyes, and gaze tracking may be performed for both eyes, and thus the technology described herein may be implemented for both the left and right eyes in an HMD.

Figure 4A:
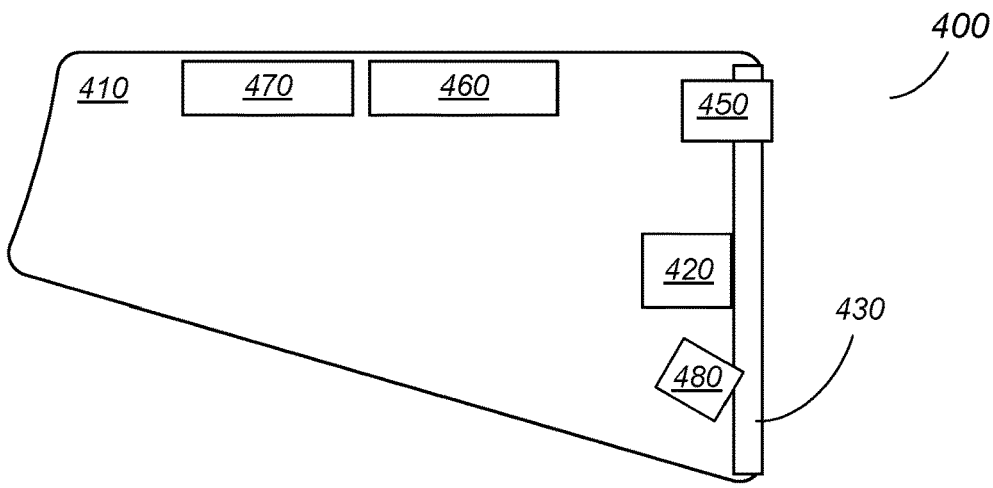
FIGS. 4A through 4C illustrate example devices in which the methods of FIGS. 2, 3 and 5 through 10 may be implemented, according to some embodiments.
Figure 4B:
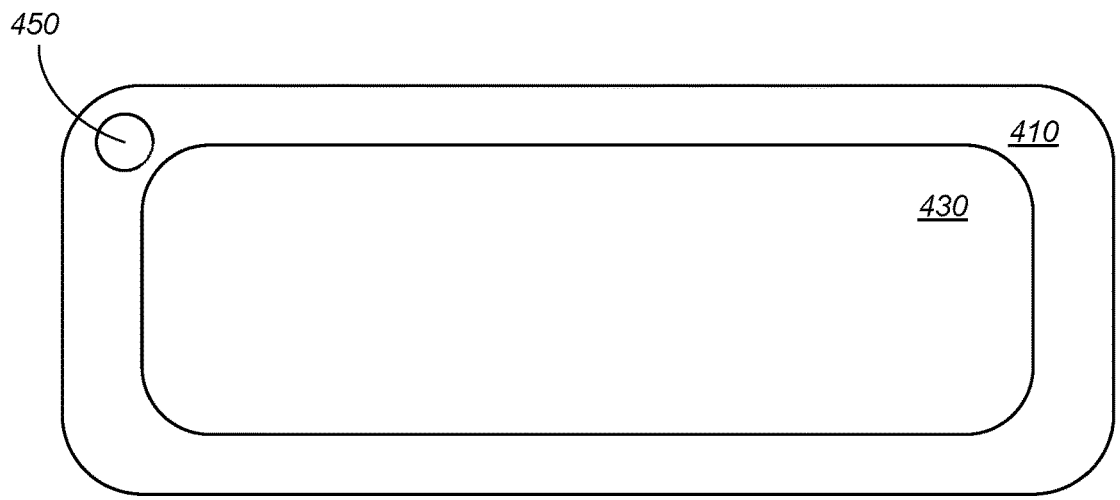
Figure 4C:
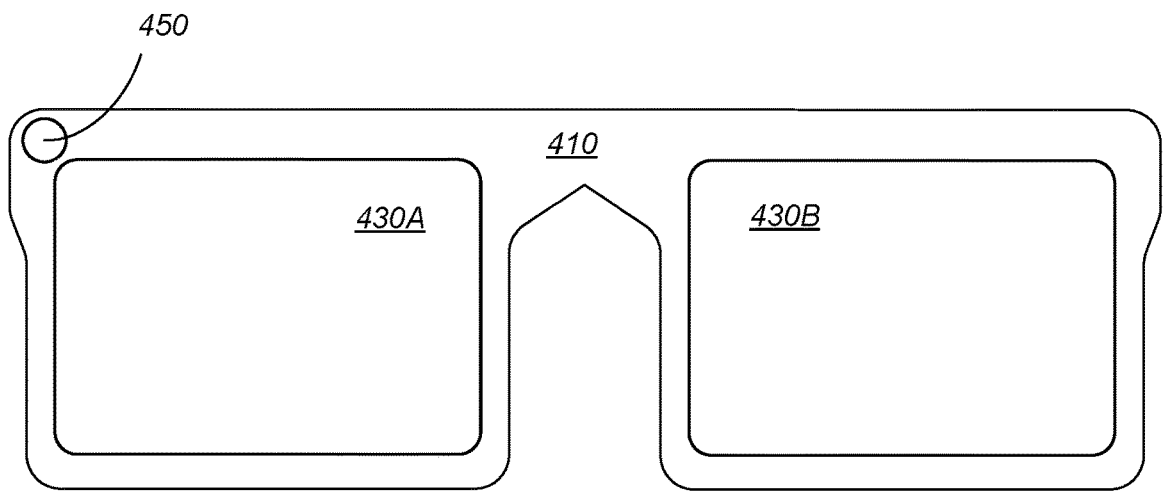

FIGS. 4A through 4C illustrate example devices in which the methods of FIGS. 2, 3 and 5 through 10 may be implemented, according to some embodiments. Note that the HMDs 400 as illustrated in FIGS. 4A through 4C are given by way of example, and are not intended to be limiting. In various embodiments, the shape, size, and other features of an HMD 400 may differ, and the locations, numbers, types, and other features of the components of an HMD 400 and of the eye imaging system. FIG. 4A shows a side view of an example HMD 400, and FIGS. 4B and 4C show alternative front views of example HMDs 400, with FIG. 4A showing device that has one lens 430 that covers both eyes and FIG. 4B showing a device that has right 430A and left 430B lenses.

HMD 400 may include lens(es) 430, mounted in a wearable housing or frame 410. HMD 400 may be worn on a user's head (the "wearer") so that the lens(es) is disposed in front of the wearer's eyes. In some embodiments, an HMD 400 may implement any of various types of display technologies or display systems. For example, HMD 400 may include a display system that directs light that forms images (virtual content) through one or more layers of waveguides in the lens(es) 420; output couplers of the waveguides (e.g., relief gratings or volume holography) may output the light towards the wearer to form images at or near the wearer's eyes. As another example, HMD 400 may include a direct retinal projector system that directs light towards reflective components of the lens(es); the reflective lens(es) is configured to redirect the light to form images at the wearer's eyes.

In some embodiments, HMD 400 may also include one or more sensors that collect information about the wearer's environment (video, depth information, lighting information, etc.) and about the wearer (e.g., eye or gaze tracking sensors). The sensors may include one or more of, but are not limited to one or more eye tracking cameras 420 (e.g., infrared (IR) cameras) that capture views of the user's eyes, one or more world-facing or PoV cameras 450 (e.g., RGB video cameras) that can capture images or video of the real-world environment in a field of view in front of the user, and one or more ambient light sensors that capture lighting information for the environment. Cameras 420 and 450 may be integrated in or attached to the frame 410. HMD 400 may also include one or more light sources 480 such as LED or infrared point light sources that emit light (e.g., light in the IR portion of the spectrum) towards the user's eye or eyes.

A controller 460 for the XR system may be implemented in the HMD 400, or alternatively may be implemented at least in part by an external device (e.g., a computing system or handheld device) that is communicatively coupled to HMD 400 via a wired or wireless interface. Controller 460 may include one or more of various types of processors, image signal processors (ISPs), graphics processing units (GPUs), coder/decoders (codecs), system on a chip (SOC), CPUs, and/or other components for processing and rendering video and/or images. In some embodiments, controller 460 may render frames (each frame including a left and right image) that include virtual content based at least in part on inputs obtained from the sensors and from an eye tracking system, and may provide the frames to the display system.

Memory 470 for the XR system may be implemented in the HMD 400, or alternatively may be implemented at least in part by an external device (e.g., a computing system) that is communicatively coupled to HMD 400 via a wired or wireless interface. The memory 470 may, for example, be used to record video or images captured by the one or more cameras 450 integrated in or attached to frame 410. Memory 470 may include any type of memory, such as dynamic random-access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration. In some embodiments DRAM may be used as temporary storage of images or video for processing, but other storage options may be used in an HMD to store processed data, such as Flash or other "hard drive" technologies. This other storage may be separate from the externally coupled storage mentioned below.

While FIGS. 4A through 4C only show light sources 480 and cameras 420 and 450 for one eye, embodiments may include light sources 480 and cameras 420 and 450 for each eye, and gaze tracking may be performed for both eyes. In addition, the light sources, 480, eye tracking camera 420 and PoV camera 450 may be located elsewhere than shown.

Figure 11:
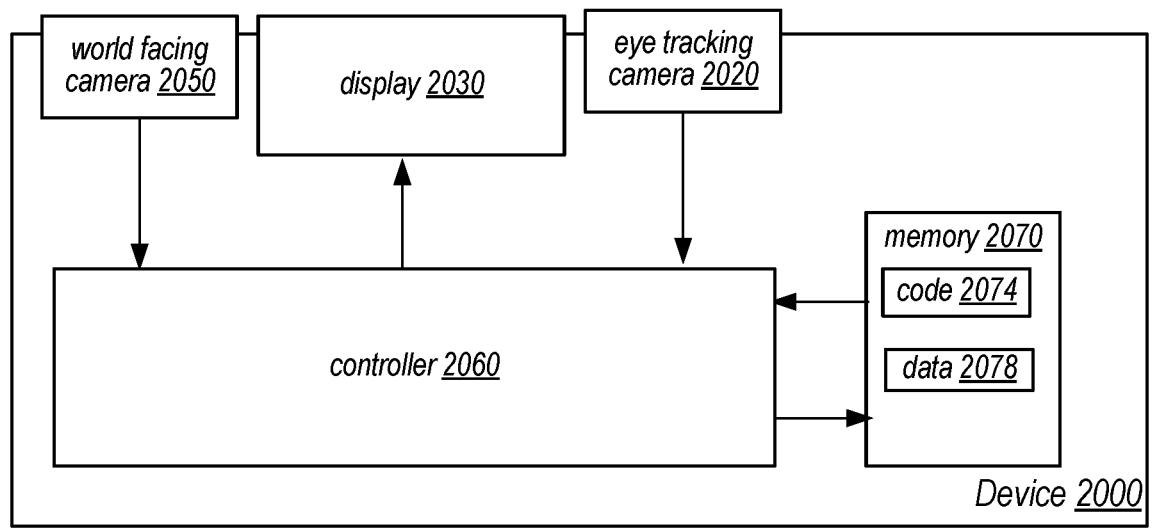
FIG. 11 is a block diagram illustrating an example device that may include components and implement methods as illustrated in FIGS. 2 through 10, according to some embodiments.

FIG. 11 further illustrates components of an HMD and XR system, according to some embodiments.

Embodiments of an HMD 400 as illustrated in FIGS. 4A-4C may, for example, be used in augmented or mixed (AR) applications to provide augmented or mixed reality views to the wearer. HMD 400 may include one or more sensors, for example located on external surfaces of the HMD 400, that collect information about the wearer's external environment (video, depth information, lighting information, etc.); the sensors may provide the collected information to controller 460 of the XR system. The sensors may include one or more visible light cameras 450 (e.g., RGB video cameras) that capture video of the wearer's environment that, in some embodiments, may be used to provide the wearer with a virtual view of their real environment. In some embodiments, video streams of the real environment captured by the visible light cameras 450 may be processed by the controller 460 of the HMD 400 to render augmented or mixed reality frames that include virtual content overlaid on the view of the real environment, and the rendered frames may be provided to the display system. In some embodiments, input from the eye tracking camera 420 may be used in a PCCR gaze tracking process executed by the controller 460 to track the gaze/pose of the user's eyes for use in rendering the augmented or mixed reality content for display. In addition, one or more of the methods as illustrated in FIGS. 2, 3, and 5 through 10 may be implemented in the HMD to provide corrected gaze direction and origin for the HMD 400.

Figure 5:
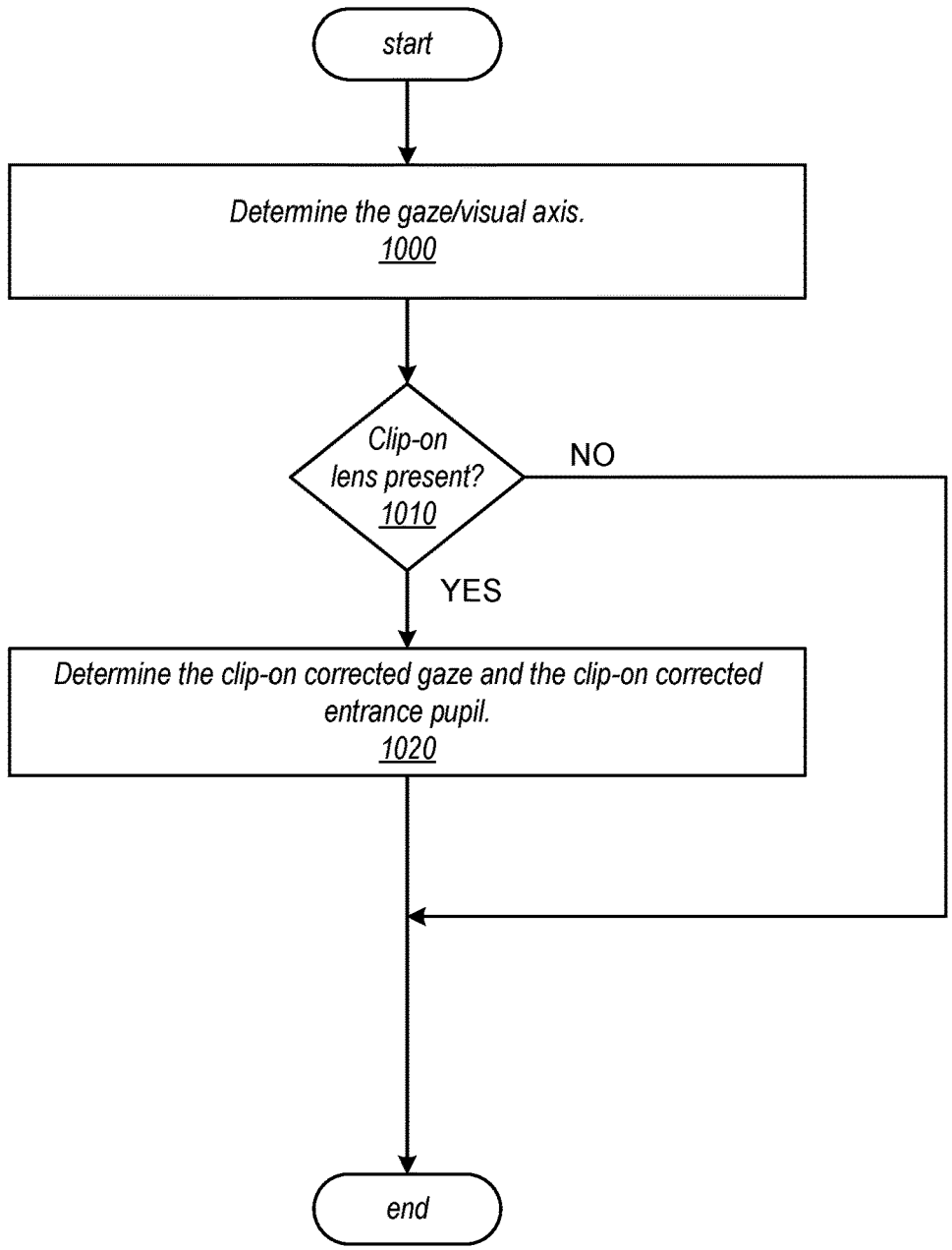
FIG. 5 is a high-level flowchart of an enrollment method for a device in which the methods of FIGS. 2 and 3 are implemented, according to some embodiments.

FIG. 5 is a high-level flowchart of an enrollment method for a device in which the methods of FIGS. 2 and 3 are implemented, according to some embodiments. As indicated at 1000, the gaze or visual axis is determined. At 1010, if a clip-on lens is present, then the clip-on corrected gaze and the clip-on corrected entrance pupil are calculated as indicated at 1020. Presence of a clip-on lens may be detected automatically by the HMD, or manually through user input.

Figure 6:
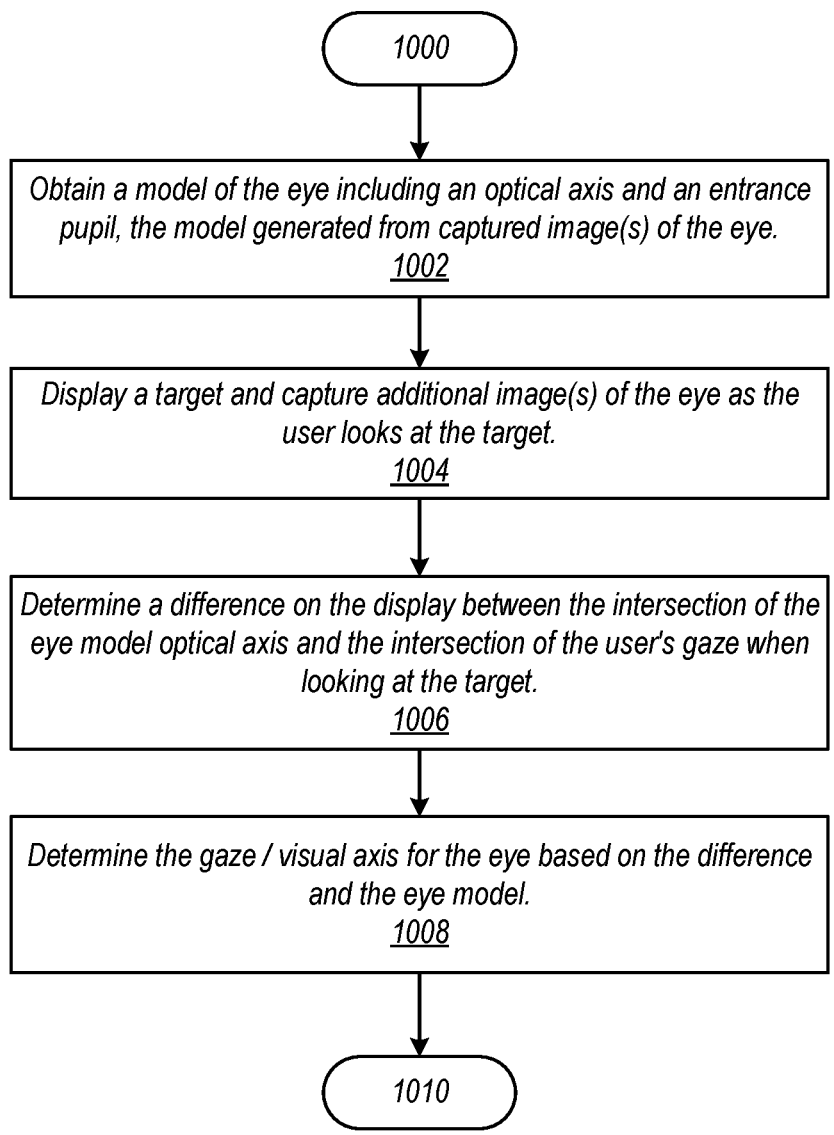
FIG. 6 is a flowchart of a method for estimating the visual axis during enrollment, according to some embodiments.

FIG. 6 is a flowchart of a method for estimating the gaze visual axis during enrollment, according to some embodiments. This method may be performed at element 1000 of FIG. 5. As indicated at 1002, a model of the eye including but not limited to an optical axis and an entrance pupil as illustrated in FIG. 1 may be obtained. The eye model may be generated at least in part from captured image(s) of the eye in a process that is performed prior to the method of FIG. 5. As indicated at 1004, a target point or prompt may be shown on the display screen; the user may be requested to look at the target. Additional image(s) of the eye may be captured as the user looks at the target. As indicated at 1006, a difference on the display between the eye model optical axis and the user's gaze direction when looking at the target may be determined. As indicated at 1008, the gaze/visual axis for the eye may be determined based on the difference and the eye model.

Figure 7:
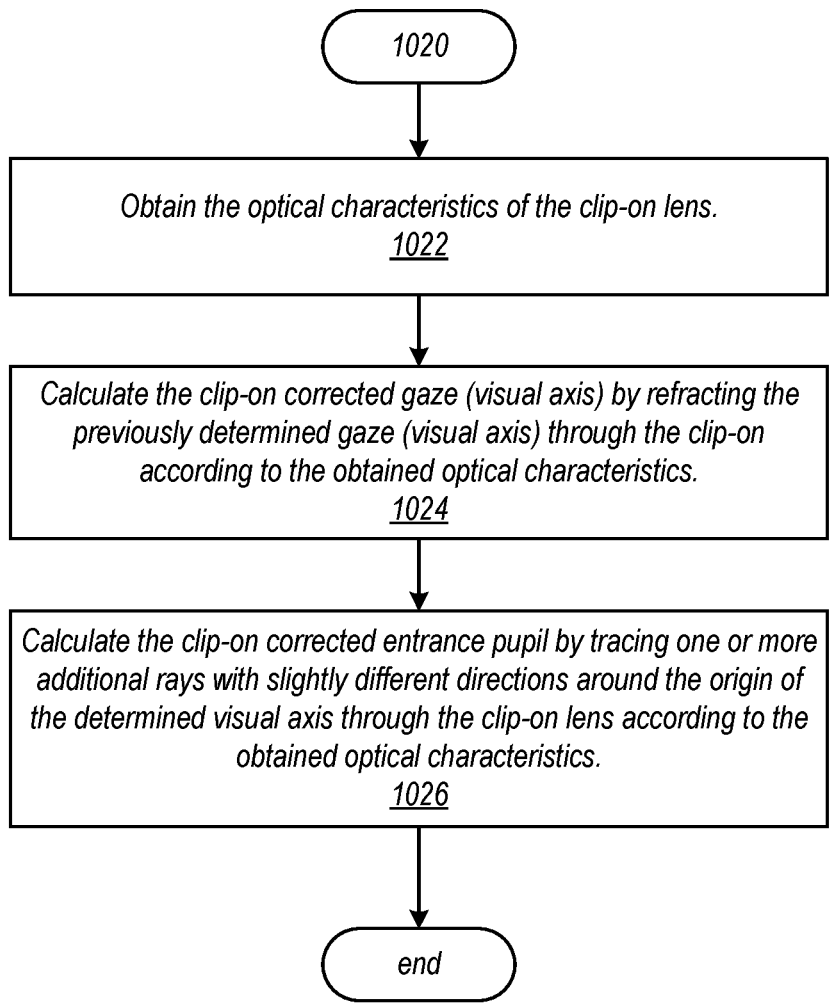
FIG. 7 is a flowchart of a method for estimating the clip-on corrected gaze and clip-on corrected entrance pupil during enrollment, according to some embodiments.

FIG. 7 is a flowchart of a method for estimating the clip-on corrected gaze and clip-on corrected entrance pupil during enrollment, according to some embodiments. This method may be performed at element 1020 of FIG. 5. As indicated at 1022, the optical characteristics of the clip-on lens may be obtained. In some embodiments, for example, presence of the clip-on lens may be determined automatically or manually from user input. In addition, identifying information for the lens (e.g., a product number) may be obtained from the clip-on lens or manually. The optical characteristics for the lens may then be obtained based on the identifier from local memory or from a remote source via a wired or wireless connection. The optical characteristics may, for example, indicate lens shape, lens power, and any other information relative to the optical properties of the lens. As indicated at 1024, the clip-on corrected gaze (visual axis) may be calculated by an algorithm that traces or "refracts" the previously determined gaze (visual axis) through the clip-on lens according to the obtained optical characteristics. As indicated at 1026, the clip-on corrected entrance pupil may then be estimated by tracing one or more additional rays with slightly different directions around the origin of the determined visual axis through the clip-on lens according to the obtained optical characteristics. The intersection of these ray(s) with the determined visual axis provides an estimation of the corrected entrance pupil.

Figure 8:
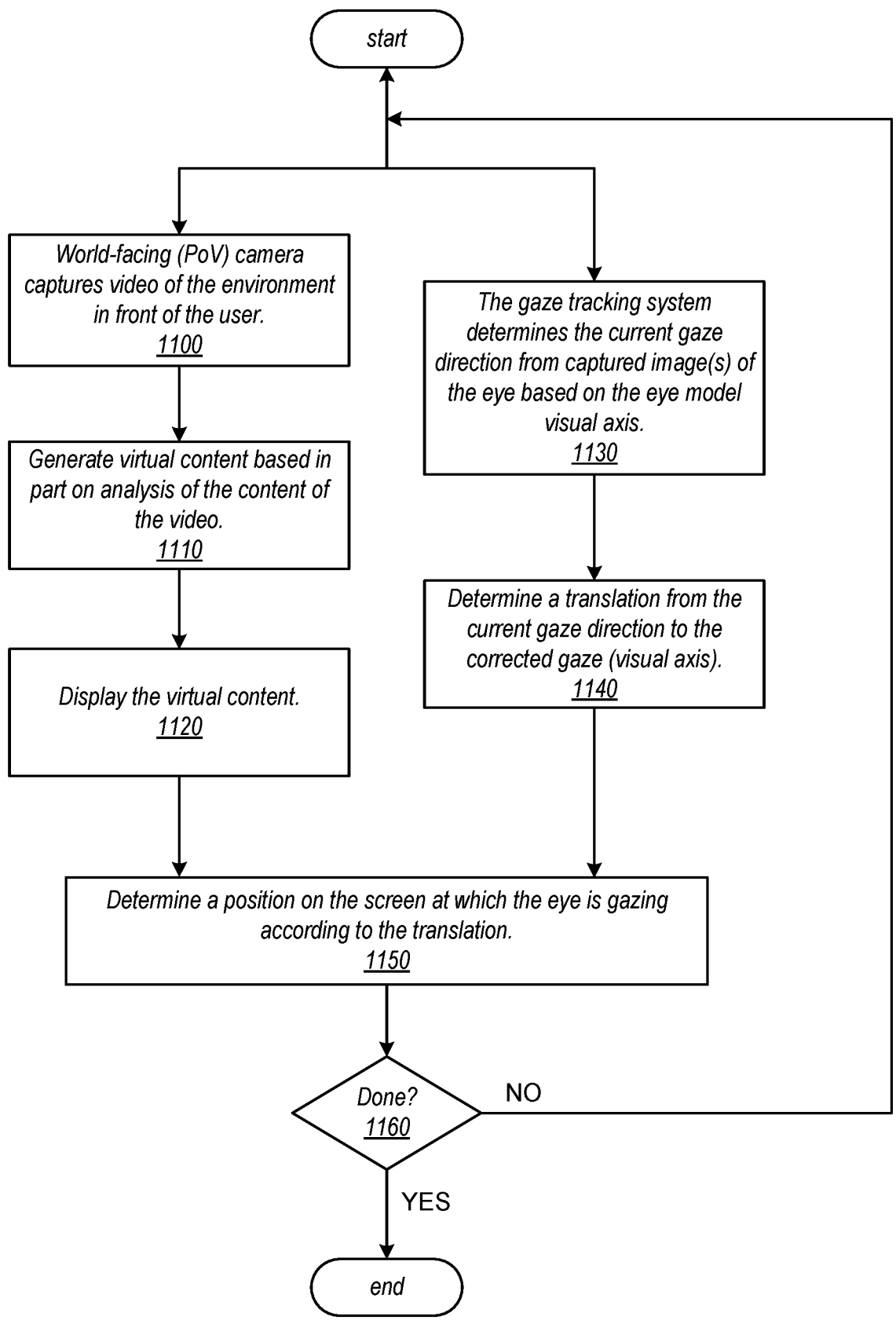
FIG. 8 is a flowchart of a method for correcting the point of view during use of a device, according to some embodiments.

FIG. 8 is a flowchart of a method for correcting the point of view during use of a device, according to some embodiments. In some embodiments, the method of FIG. 8 may be performed for every frame processed by the HMD during use of the device. In some embodiments, elements 1130 and 1140 may be performed in parallel with elements 1100, 1110, and 1120. However, in some embodiments, elements 1130 and 1140, or just element 1140, may instead be performed after element 1120.

As indicated at 1100, a world-facing (PoV) camera captures video of the environment in front of the user. As indicated at 1110, virtual content may be generated based in part on analysis of the content of the video. As indicated at 1120, a least the virtual content may be displayed by the display system of the HMD.

Figure 10:
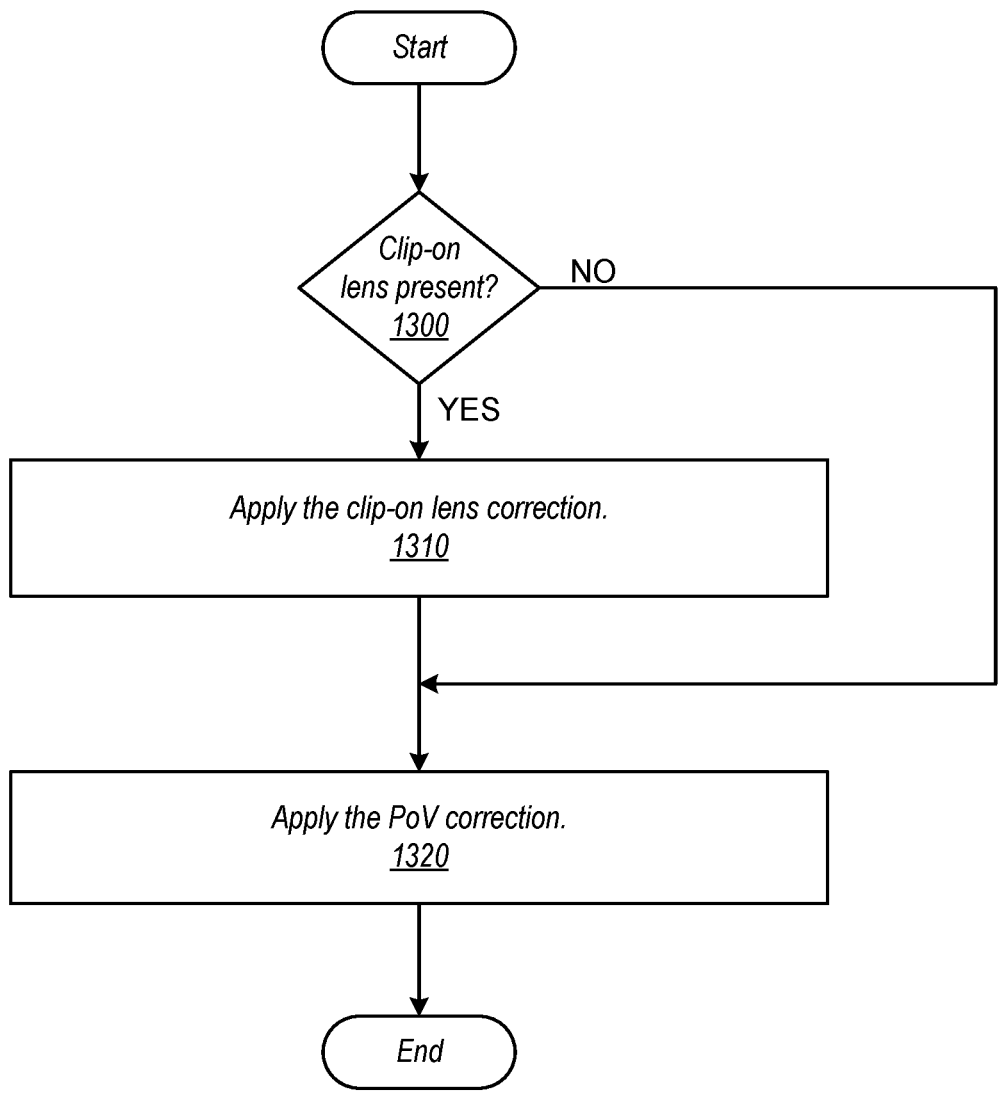
FIG. 10 is a flowchart of a method of applying clip-on lens and point of view corrections during use of a device, according to some embodiments.

As indicated at 1130, the gaze tracking system determines a current gaze direction from captured image(s) of the eye based on the eye model visual axis. As indicated at 1140, a translation from the current gaze direction determined by the eye tracking system to the current corrected gaze is determined. FIG. 10 further illustrates element 1140. As indicated at 1140, a position on the screen at which the eye is actually looking is estimated based at least in part on the determined translation.

As indicated by the arrow returning from element 1160 to elements 1100 and 1130, this method may continue for as long as the device is in use.

Figure 9:
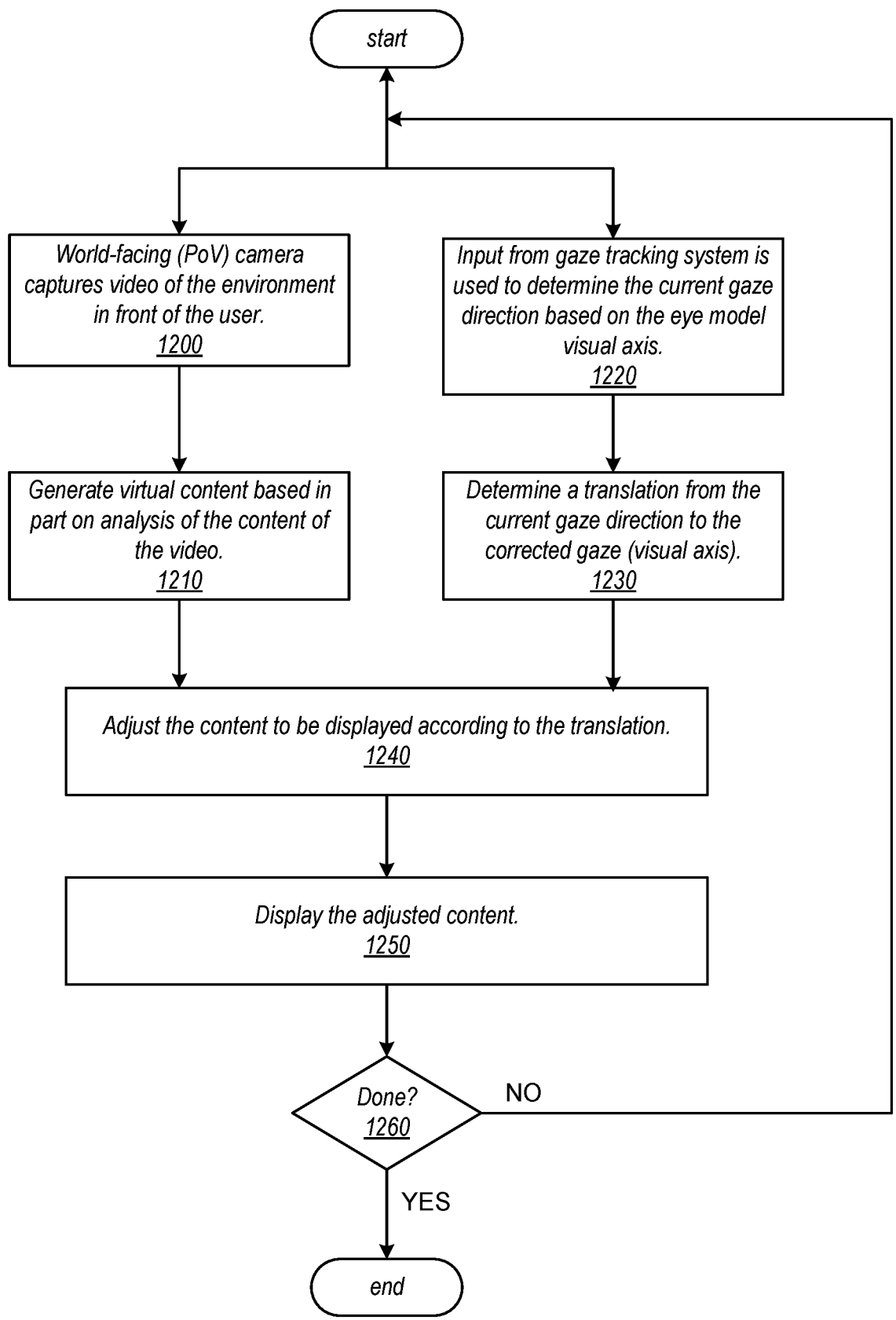
FIG. 9 is a flowchart of a method for adjusting displayed content during use of a device, according to some embodiments.

FIG. 9 is a flowchart of a method for adjusting displayed content during use of a device, according to some embodiments. In some embodiments, the method of FIG. 9 may be performed for every frame processed by the HMD during use of the device. In some embodiments, elements 1220 and 1230 may be performed in parallel with elements 1200 and

1210. However, in some embodiments, elements 1220 and 1230, or just element 1240, may instead be performed after element 1210.

As indicated at 1200, a world-facing (PoV) camera captures video of the environment in front of the user. As indicated at 1210, virtual content may be generated based in part on analysis of the content of the video.

As indicated at 1220, the gaze tracking system determines a current gaze direction from captured image(s) of the eye based on the eye model visual axis. As indicated at 1230, a translation from the current gaze direction determined by the eye tracking system to the current corrected gaze is determined. FIG. 10 further illustrates element 1230.

As indicated at 1240, the content generated at 1210, for example the position on the display screen at which the content is to be displayed, may be adjusted based at least in part on the translation determined at element 1230. As indicated at 1250, a least the adjusted virtual content may be displayed by the display system of the HMD.

FIG. 10 is a flowchart of a method of applying clip-on lens and point of view corrections during use of a device, according to some embodiments. The method of FIG. 10 may, for example, be performed at element 1140 of FIG. 8 or at element 1230 of FIG. 9. As indicated at 1300, if a clip-on lens is present in the device, then at 1310 the clip-on lens correction as determined by the method of FIG. 7 may be first applied to the visual axis. As indicated at 1320, whether there is a clip-on lens present or not, the PoV correction as determined by the method of FIG. 6 is applied to the visual axis (or to the clip-on lens corrected axis as determined at element 1310.

The clip-on corrected entrance pupil that was estimated at element 1020 of FIG. 5 may, for example, be used in correcting the content to be displayed. Due to the presence of lenses between the user's eyes and the display, without correction the content may appear warped or distorted. To account for this, the system may apply an algorithm to warp the content prior to display to counter the distortion caused by the lens(es). This warp may, for example, be performed at element 1110 of FIG. 8 or at element 1210 of FIG. 9. In performing the warp, the pupil position/entrance pupil is needed. If the entrance pupil from the eye model is used, the warp would be off due to the distortion introduced by the clip-on lens. The estimated clip-on corrected entrance pupil may thus be used in performing the warp to account for the presence of the clip-on lens.

In some embodiments, the PoV camera as illustrated in FIGS. 2 and 4A-4C may be configured to move, thus changing the PoVC axis and render origin. Once the corrected visual axis is determined as illustrated in FIGS. 2 and 3, correcting for this motion of the PoV camera is a relatively simple mapping from the PoVC axis to the corrected visual axis.

In some embodiments, a system may use both the corrected gaze and the uncorrected gaze. For example, the corrected gaze as determined in FIGS. 2 and 3 may be used in determining what the user is looking at on the display, while the uncorrected gaze may be used when distorting content to be displayed. As another example, the uncorrected gaze may be used when classifying eye motion as a fixed or a saccade motion. When classifying eye motion, how the gaze actually lines up with the user interface provided on the display does no matter. It is generally preferable to use the simplest signal in this method, which is the uncorrected gaze. If the eye motion classifier used the corrected gaze, the method would have to ensure that any motion of the POV camera is not eye motion that is not actually there.

FIG. 11 is a block diagram illustrating an example device that may include components and implement methods as illustrated in FIGS. 2 through 10, according to some embodiments.

In some embodiments, an XR system may include a device 2000 such as a headset, helmet, goggles, or glasses. Device 2000 may implement any of various types of display technologies. For example, device 2000 may include a transparent or translucent display 2060 (e.g., eyeglass lenses) through which the user may view the real environment and a medium integrated with display 2060 through which light representative of virtual images is directed to the wearer's eyes to provide an augmented view of reality to the wearer.

In some embodiments, device 2000 may include a controller 2060 configured to implement functionality of the XR system and to generate frames (each frame including a left and right image) that are provided to display 2030. In some embodiments, device 2000 may also include memory 2070 configured to store software (code 2074) of the XR system that is executable by the controller 2060, as well as data 2078 that may be used by the XR system when executing on the controller 2060. In some embodiments, memory 2070 may also be used to store video captured by camera 2050. In some embodiments, device 2000 may also include one or more interfaces (e.g., a Bluetooth technology interface, USB interface, etc.) configured to communicate with an external device (not shown) via a wired or wireless connection. In some embodiments, at least a part of the functionality described for the controller 2060 may be implemented by the external device. The external device may be or may include any type of computing system or computing device, such as a desktop computer, notebook or laptop computer, pad or tablet device, smartphone, hand-held computing device, game controller, game system, and so on.

In various embodiments, controller 2060 may be a uniprocessor system including one processor, or a multiprocessor system including several processors (e.g., two, four, eight, or another suitable number). Controller 2060 may include central processing units (CPUs) configured to implement any suitable instruction set architecture, and may be configured to execute instructions defined in that instruction set architecture. For example, in various embodiments controller 2060 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 2060 may employ any microarchitecture, including scalar, superscalar, pipelined, superpipelined, out of order, in order, speculative, non-speculative, etc., or combinations thereof. Controller 2060 may include circuitry to implement microcoding techniques. Controller 2060 may include one or more processing cores each configured to execute instructions. Controller 2060 may include one or more levels of caches, which may employ any size and any configuration (set associative, direct mapped, etc.). In some embodiments, controller 2060 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 2060 may include one or more other components for processing and rendering video and/or images, for example image signal processors (ISPs), coder/decoders (codecs), etc.

Memory 2070 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration. In some embodiments DRAM may be used as temporary storage of images or video for processing, but other storage options may be used to store processed data, such as Flash or other "hard drive" technologies.

In some embodiments, device 2000 may include one or more sensors that collect information about the user's environment (video, depth information, lighting information, etc.). The sensors may provide the information to the controller 2060 of the XR system. In some embodiments, the sensors may include, but are not limited to, at least one visible light camera (e.g., an RGB video camera) 2050, ambient light sensors, and at least on eye tracking camera 2020. In some embodiments, device 2000 may also include one or more IR light sources; light from the light sources reflected off the eye may be captured by the eye tracking camera 2020. Gaze tracking algorithms implemented by controller 2060 may process images or video of the eye captured by the camera 2020 to determine eye pose and gaze direction. In addition, one or more of the methods as illustrated in FIGS. 2, 3, and 5 through 10 may be implemented in device 2000 to provide corrected gaze direction and origin for the device 2000.

In some embodiments, device 2000 may be configured to render and display frames to provide an augmented or mixed reality (MR) view for the user based at least in part according to sensor inputs, including input from the eye tracking camera 2020. The MR view may include renderings of the user's environment, including renderings of real objects in the user's environment, based on video captured by one or more video cameras that capture high-quality, high-resolution video of the user's environment for display. The MR view may also include virtual content (e.g., virtual objects, virtual tags for real objects, avatars of the user, etc.) generated by the XR system and composited with the displayed view of the user's real environment.

Extended Reality

A real environment refers to an environment that a person can perceive (e.g., see, hear, feel) without use of a device. For example, an office environment may include furniture such as desks, chairs, and filing cabinets; structural items such as doors, windows, and walls; and objects such as electronic devices, books, and writing instruments. A person in a real environment can perceive the various aspects of the environment, and may be able to interact with objects in the environment.

An extended reality (XR) environment, on the other hand, is partially or entirely simulated using an electronic device. In an XR environment, for example, a user may see or hear computer generated content that partially or wholly replaces the user's perception of the real environment. Additionally, a user can interact with an XR environment. For example, the user's movements can be tracked and virtual objects in the XR environment can change in response to the user's movements. As a further example, a device presenting an XR environment to a user may determine that a user is moving their hand toward the virtual position of a virtual object, and may move the virtual object in response. Additionally, a user's head position and/or eye gaze can be tracked and virtual objects can move to stay in the user's line of sight.

Examples of XR include augmented reality (AR), virtual reality (VR) and mixed reality (MR). XR can be considered along a spectrum of realities, where VR, on one end, completely immerses the user, replacing the real environment with virtual content, and on the other end, the user experiences the real environment unaided by a device. In between are AR and MR, which mix virtual content with the real environment.

VR generally refers to a type of XR that completely immerses a user and replaces the user's real environment. For example, VR can be presented to a user using a head mounted device (HMD), which can include a near-eye display to present a virtual visual environment to the user and headphones to present a virtual audible environment. In a VR environment, the movement of the user can be tracked and cause the user's view of the environment to change. For example, a user wearing a HMD can walk in the real environment and the user will appear to be walking through the virtual environment they are experiencing. Additionally, the user may be represented by an avatar in the virtual environment, and the user's movements can be tracked by the HMD using various sensors to animate the user's avatar.

AR and MR refer to a type of XR that includes some mixture of the real environment and virtual content. For example, a user may hold a tablet that includes a camera that captures images of the user's real environment. The tablet may have a display that displays the images of the real environment mixed with images of virtual objects. AR or MR can also be presented to a user through an HMD. An HMD can have an opaque display, or can use a see-through display, which allows the user to see the real environment through the display, while displaying virtual content overlaid on the real environment.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A device, comprising:
a display configured to be positioned in front of an eye;
an eye-facing camera configured to capture images of the eye;
a lens configured to be between the eye and the display; and
a controller comprising one or more processors configured to:
obtain a model of the eye including an optical axis and an entrance pupil;
obtain one or more images of the eye captured when the eye is looking at a target prompt on the display;
determine, from the one or more images, a difference on the display between a gaze direction of the eye when looking at the target prompt and the optical axis of the model of the eye; and
determine a visual axis for the eye based on the determined difference and the model of the eye;
calculate a lens-corrected gaze axis by tracing a ray representing the visual axis through the lens according to optical characteristics of the lens; and
calculate a corrected entrance pupil by tracing one or more additional virtual rays through the lens according to the optical characteristics and determining an intersection of the one or more additional virtual rays with the ray representing the visual axis.

2. The device as recited in claim 1, further comprising a point of view (PoV) camera configured to capture video of an environment in front of the device, and wherein the controller is further configured to:
generate virtual content to be displayed based in part on analysis of content of the video captured by the PoV camera;
determine a current gaze direction of the eye based on the model visual axis from images of the eye captured while the virtual content is being displayed;
determine a translation from the current gaze direction to a corrected gaze direction based at least in part on the visual axis for the eye; and
determine a position on the display at which the eye is looking based on the translation.

3. The device as recited in claim 2, further comprising the lens configured to be added to the device between the eye and the display, wherein the controller is further configured to:
detect presence of the lens in the device; and
obtain the optical characteristics of the lens.

4. The device as recited in claim 3, wherein the controller is further configured to calculate the corrected entrance pupil by tracing one or more additional virtual rays, wherein the one or more additional virtual rays proceed to different directions around an origin of the determined visual axis.

5. The device as recited in claim 3, wherein, to determine a translation from the current gaze direction to a corrected gaze direction based at least in part on the visual axis for the eye, the controller is further configured to apply a correction to the current gaze direction based on the lens-corrected gaze axis prior to applying a correction based on the POV camera.

6. The device as recited in claim 1, further including one or more light sources configured to emit light rays towards the eye, wherein a portion of the emitted light rays are reflected off the eye towards the eye-facing camera.

7. The device as recited in claim 6, wherein the eye-facing camera is configured to capture images including the cornea, iris, and pupil of the eye as illuminated by the one or more light sources, wherein the captured images are processed by the controller to generate the model of the eye.

8. The device as recited in claim 1, wherein the device is a head-mounted device (HMD) of an extended reality (XR) system.

9. A method, comprising:
performing, by a controller comprising one or more processors:
obtaining a model of an eye including an optical axis and an entrance pupil;
receiving one or more images of the eye captured by an eye-facing camera when the eye is looking at a target prompt on a display;
determining, from the one or more images, a difference on the display between a gaze direction of the eye when looking at the target prompt and the optical axis;
determining a visual axis for the eye based on the determined difference and the model of the eye;
calculating a lens-corrected gaze axis by tracing a ray representing the visual axis through a lens between the display and the eye according to optical characteristics of the lens; and
calculating a corrected entrance pupil by tracing one or more additional virtual rays through the lens according to the obtained optical characteristics and determining an intersection of the one or more additional virtual rays with the ray representing the visual axis.

10. The method as recited in claim 9, further comprising:
generating virtual content to be displayed based in part on analysis of content of video captured by a point of view (PoV) camera;
determining a current gaze direction of the eye based on the model visual axis from images of the eye captured while the virtual content is being displayed;
determining a translation from the current gaze direction to a corrected gaze direction based at least in part on the visual axis for the eye; and
determining a position on the display at which the eye is looking based on the translation.

11. The method as recited in claim 10, further comprising:
detecting presence of the lens between the display and the eye; and
obtaining the optical characteristics of the lens.

12. The method as recited in claim 11, further comprising calculating the corrected entrance pupil by tracing one or more additional virtual rays, wherein the one or more additional virtual rays proceed to different.

13. The method as recited in claim 11, wherein determining a translation from the current gaze direction to a corrected gaze direction based at least in part on the visual axis for the eye comprises applying a correction to the current gaze direction based on the lens-corrected gaze axis prior to applying a correction based on the POV camera.

14. The method as recited in claim 9, further including one or more light sources configured to emit light rays towards the eye, wherein a portion of the emitted light rays are reflected off the eye towards the eye-facing camera.

15. The method as recited in claim 14, wherein obtaining a model of an eye including an optical axis and an entrance pupil comprises:
receiving, from the eye-facing camera, images including the cornea, iris, and pupil of the eye as illuminated by one or more light sources; and
generating the model of the eye from the captured images.

16. The method as recited in claim 9, wherein the controller, display, and eye-facing camera are components of a head-mounted device (HMD) of an extended reality (XR) system.

17. A system, comprising:
a head-mounted device (HMD), comprising:
a display configured to be positioned in front of an eye;
an eye-facing camera configured to capture images of the eye;
a point of view (PoV) camera configured to capture video of an environment in front of the device; and
a controller comprising one or more processors configured to:
generate a model of the eye including an optical axis and an entrance pupil based on images of the eye captured by the eye-facing camera;
determine a visual axis for the eye based on a difference between a gaze direction of the eye when looking at a target prompt on the display and the optical axis;
generate and display virtual content based on content of the video captured by the PoV camera and the eye model; and
determine a position on the display at which the eye is looking according to the visual axis;
calculate a lens-corrected gaze axis by tracing a ray representing the visual axis through a lens between the eye and the display according to optical characteristics of the lens; and
calculate a corrected entrance pupil by tracing one or more additional virtual rays through the lens according to the obtained optical characteristics and determining an intersection of the one or more additional virtual rays with the ray representing the visual axis.

18. The system as recited in claim 17, further comprising the lens between the eye and the display, wherein the controller is further configured to:
obtain the optical characteristics of the lens,
wherein, to determine a position on the display at which the eye is looking according to the visual axis, the controller is further configured to apply a correction based on the lens-corrected gaze axis prior to applying a correction based on the POV camera.

19. The system as recited in claim 18, wherein the controller is further configured to calculate the corrected entrance pupil by tracing one or more additional virtual rays, wherein the one or more additional virtual rays proceed to different.

20. The system as recited in claim 17, wherein the system is an extended reality (XR) system.

* * * * *